(12) United States Patent
Vachuska

(10) Patent No.: US 8,200,969 B2
(45) Date of Patent: Jun. 12, 2012

(54) DATA VERIFICATION BY CHALLENGE

(75) Inventor: Thomas Vachuska, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 946 days.

(21) Appl. No.: 12/012,293

(22) Filed: Jan. 31, 2008

(65) Prior Publication Data

US 2009/0196296 A1 Aug. 6, 2009

(51) Int. Cl.
*H04L 9/32* (2006.01)
(52) U.S. Cl. ........ 713/168; 713/161; 707/812; 707/698; 707/999.205; 707/697; 707/699
(58) Field of Classification Search .................. 713/168, 713/161; 707/812, 698, 999.205, 697, 699
See application file for complete search history.

(56) References Cited

U.S. PATENT DOCUMENTS

| | | | |
|---|---|---|---|
| 5,990,810 A | 11/1999 | Williams | |
| 6,625,625 B1 * | 9/2003 | Kihara et al. | 1/1 |
| 7,269,689 B2 | 9/2007 | Eshghi et al. | |
| 7,634,657 B1 * | 12/2009 | Stringham | 713/168 |
| 7,733,910 B2 * | 6/2010 | Mace et al. | 370/473 |
| 7,747,582 B1 * | 6/2010 | Kaminski, Jr. | 707/687 |
| 2001/0037389 A1 * | 11/2001 | Fujimori et al. | 709/225 |
| 2005/0235043 A1 * | 10/2005 | Teodosiu et al. | 709/217 |
| 2006/0248079 A1 * | 11/2006 | Braica | 707/7 |
| 2009/0019246 A1 * | 1/2009 | Murase | 711/162 |
| 2009/0131015 A1 * | 5/2009 | Bentley et al. | 455/411 |

OTHER PUBLICATIONS

Park (Jun. 2007). Supporting practical content-addressable caching with CZIP compression, 2007 USENIX Annual Technical Conference on Proceedings of the USENIX Annual Technical Conference, p. 1-14, Jun. 17-22, 2007, Santa Clara, CA. Retrieved Jul. 28, 2011 from http://www.cs.princeton.edu~sihm/papers/czip-usenix.pdf.*

* cited by examiner

*Primary Examiner* — Ashok Patel
*Assistant Examiner* — Brian Shaw

(57) ABSTRACT

An embodiment of the invention provides an apparatus and method for data verification by challenge. The apparatus and method perform acts including: sending a hash value of a data piece in a sender; if the hash value matches a stored hash value in a receiver, then sending a challenge from the receiver to the sender; sending a sample data set from the data piece in the sender, wherein the sample data set is determined by a window that is identified by the challenge; comparing the sample data set with a data set that is overlapped by the window for a stored data piece in the receiver; and performing a response based on the comparison of the sample data set and the stored data set that is overlapped by the window for the stored data piece.

28 Claims, 3 Drawing Sheets

DATA VERIFICATION BY CHALLENGE

TECHNICAL FIELD

Embodiments of the invention relate generally to an apparatus and method for data verification by challenge.

BACKGROUND

Single instancing schemes can be performed between clients and servers in a communication network in order to minimize the amount of data that travels over the network, where the data will be ultimately stored on a server. In a single instancing scheme, a hash value of a chunk of a file (chunk-based hashing) or a hash value of a file (filed-based hashing) is first transmitted from the client to the server, and the server then compares this transmitted hash value with the server-stored hash values. If the transmitted hash value matches one of the server-stored hash values, then the server will inform the client that the data (e.g., chunk or file) is already stored in the server and that the data is not required to be transmitted by the client to the server. Therefore, this compare-by-hash mechanism allows the server to determine if the data (e.g., chunk or file) to be transmitted by the client to the server is already stored in the server, by use of hashing.

Single instancing schemes (chunk-based or file-based) offer a significant potential for network and storage bandwidth savings because data is not transferred across the network if there is a match in the comparison of hash values. However, the compare-by-hash mechanism in these schemes introduces the possibility of hash collision which involve two different pieces of data that result in the same hash value. During a hash collision scenario, the server will detect an equality between the transmitted hash value of the data to be sent from the client to the server and a stored hash value of a different data that is stored in the server. Because of the equality in hash values, the server will inform the client that the data corresponding to the transmitted hash value is already stored in the server. As a result, the client will not transmit the different piece of data to the server for storage, and the required storage into the server of this different piece of data will not occur.

Hash collisions, as well as software errors and hardware errors, can potentially result in data corruption. However, software errors and hardware errors are also non-deterministic in nature. In contrasts, hash collisions are deterministic in nature which means that hackers can potentially perform vulnerability exploits on the stored data in a network device. For example, in a distributed file system (e.g., Low Bandwidth File Systems or "LBFS") where network devices (e.g., clients and/or servers) will exchange data on-demand, a hostile network device can inject invalid data or corrupted data to a receiving network device before the valid data is transmitted to the receiving network device. In a hash collision scenario, the previously-injected invalid data and the valid data to be transmitted to the receiving network device will have the same hash value. Since the receiving device will detect the same hash value for the previously-injected invalid data and the valid data, the receiving device will not receive and will not store the valid data. In an archival file system, a hostile network device would have to pre-inject the invalid data into the receiving network device before the receiving network device receives the valid data. If the invalid data and the valid data have the same hash value, then the receiving network device will not receive and will not store the valid data.

One prior approach to reduce the likelihood of a hash collision is by using larger hash keys such as, for example, SHA-512 (Secure Hash Algorithm—512 bits) or SHA-1024. Several archive vendors have adopted this prior approach of using larger hash keys to represent data content. However, this prior approach does not eliminate the above-discussed deterministic nature of the compare-by-hash mechanism and also does not detect a hash collision condition. Therefore, the current technology is subjected to at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
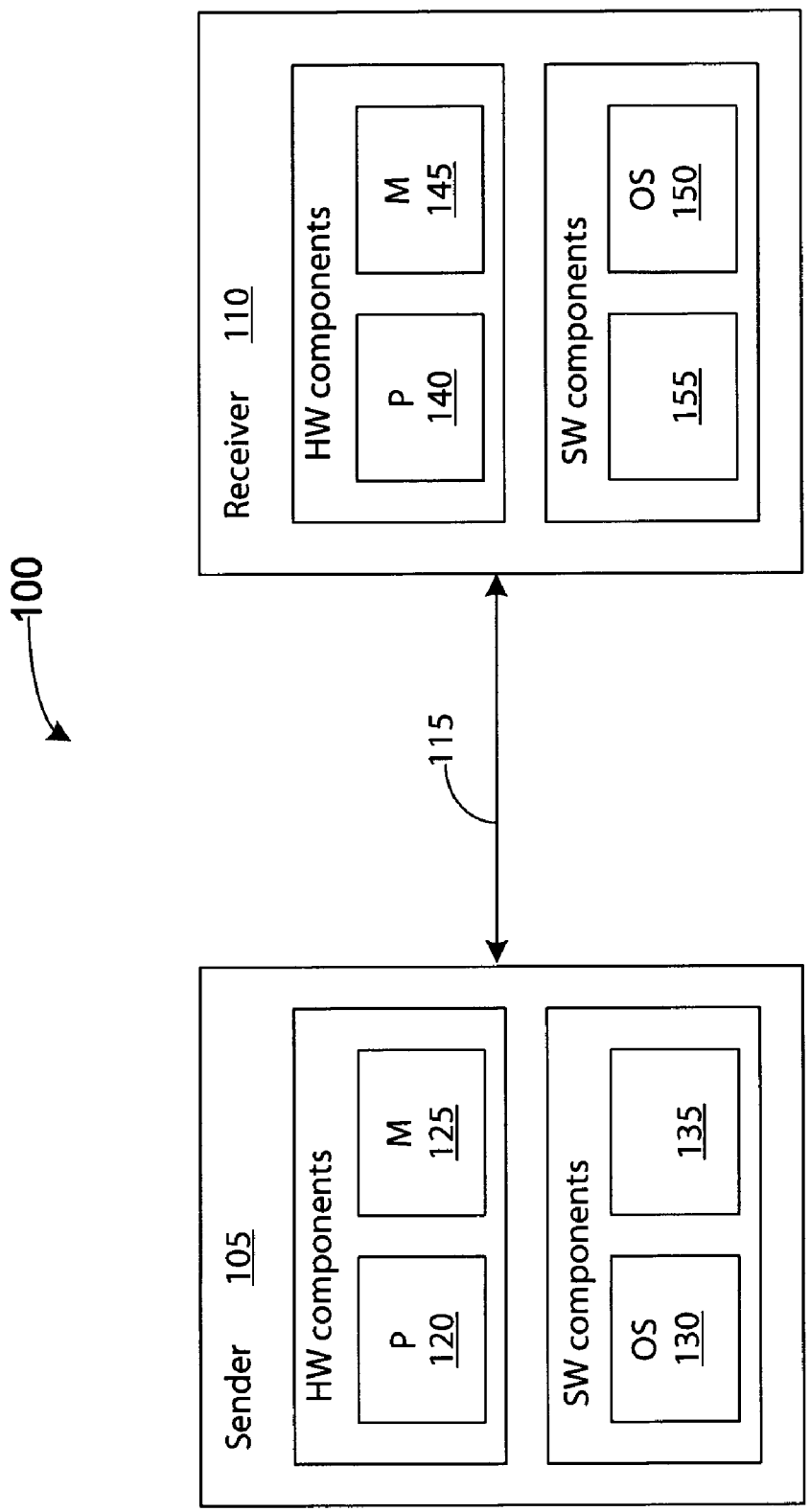
FIG. 1 is a block diagram of an apparatus (system) in accordance with an embodiment of the invention.

FIG. 1 is a block diagram of a system (apparatus) 100 in accordance with an embodiment of the invention. The system 100 includes a network device 105 and a network device 110. The network devices 105 and 110 are connected by a network 115. The apparatus 100 provides an in-band network system. Archival File Systems and Low Bandwidth File Systems (LBFS) are two examples of an in-band network system. Generally, in an in-band network system, a sender 105 (i.e., network device 105) sends a hash value of a data to a receiver 110 (i.e., network device 110), and the receiver 110 compares the transmitted hash value from the sender 105 with stored hash values in the receiver 110. If the transmitted hash value does not match any of the stored hash values, then the receiver does not have the data and will request the sender to send the data to the receiver. An embodiment of the invention provides a data verification method by use of a challenge 240 (FIG. 2), if the transmitted hash value matches one of the stored hash values, as discussed further below. This method can reduce the likelihood of a hash collision and provide a response to attempted exploits on the receiver 110, as discussed further below.

The network devices 105 and 110 can be, for example, client computer devices and servers, respectively. The network device 105 includes various hardware components for performing computing operations such as a processor 120 for performing processing functions and memory 125 for storing data, and also includes various software components such as an operating system 130 for performing various known operating system functions and a sender-side data verification engine 135 for use in a data verification method with a challenge, as discussed further below. The network device 110 also includes various hardware components for performing computing operations such as a processor 140 and memory 145, and also includes various software components such as an operating system 150 and a receiver-side data verification engine 155 for use in a data verification method with a challenge. The verification engines 135 and 155 can be implemented by use of, for example, standard software programming languages (e.g., C or C++) and can be programmed by use of, for example, standard software programming techniques. Standard network communication interfaces and components are also included in the devices 105 and 110 in order to permit these devices to access and send/receive data across the network 115. Other standard elements in the devices 105 and 110, and in network 115, are not shown in FIG. 1 for purposes of focusing the discussion on features of embodiments of the invention.

Figure 2:
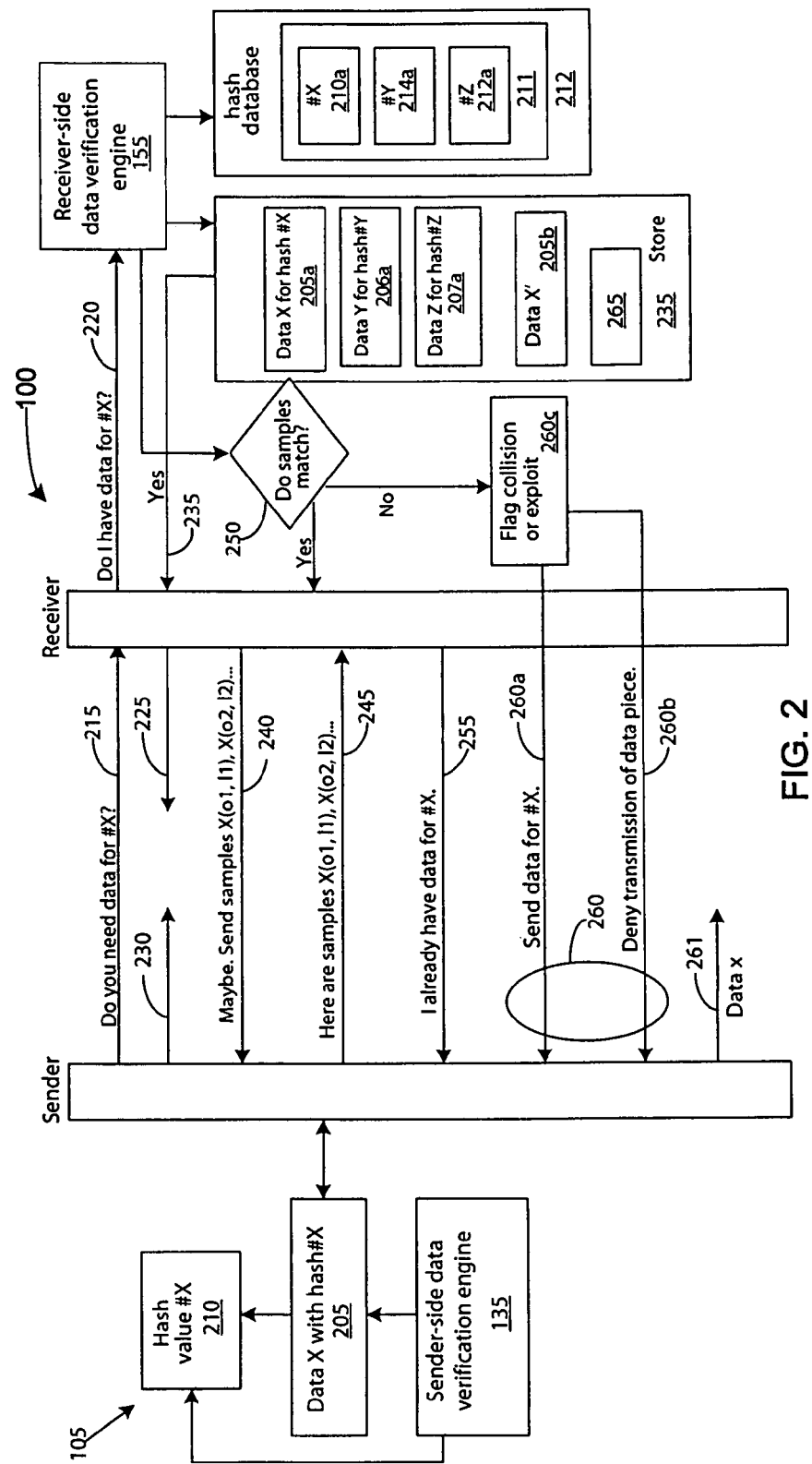
FIG. 2 is a block diagram that shows additional details of an apparatus for performing data verification by challenge, in accordance with an embodiment of the invention.

FIG. 2 is a block diagram that shows additional details of an apparatus 100 for performing data verification by challenge, in accordance with an embodiment of the invention. Assume that the sender 105 will need to send a data piece (data X) 205 to the receiver 110 if the receiver 110 does not currently store the data piece 205. The data piece 205 can be a file or a chunk of a file. Chunking algorithms that are used for dividing a file into chunks are discussed in, for example, commonly-assigned U.S. Pat. No. 7,269,689. As also known to those skilled in the art, chunking algorithms are also used in Low Bandwidth File Systems (LBFS) in order to divide a file into chunks and are also disclosed in, for example, U.S. Pat. No. 5,990,810. The data verification engine 135 will first perform a hash function on the data piece 205 in order to compute and generate a hash value (hash #X) 210 of the data piece 205. Note that in another embodiment of the invention, a separate hash algorithm engine can perform the computation and generation of the hash value 210 for the data piece 205. As known to those skilled in the art, hashing is the transformation of a string of characters into a usually shorter fixed-length value (or key) that represents the original string. The hashing algorithm for calculating a hash value 210 can be any suitable data hashing algorithm such as, for example, the various hashing algorithms that are used in Low Bandwidth File Systems or Archival File systems. MD5 (message digest 5) is one example of a hashing algorithm that can be used in the above hashing functions, although other hashing algorithms can be used as well. The data verification engine 135 will transmit 215 the hash value 210 of data piece 205 to the receiver 110. The receiver-side data verification engine 155 determines 220 if the receiver 110 already has the data piece 205 by comparing the transmitted hash value 210 with stored hash values 211 in a hash database 212.

An example is now first described where a new data piece X (205) with hash value #X (210) is stored in the sender 105 and is not yet stored in the receiver 110. In this example, a transmitted hash value 210 of the data piece 205 will not equal the value any of the stored hashes 211, because a copy 205a of the data piece 205 is not currently stored in the database (data store) 235. The receiver-side data verification engine 155 (in receiver 110) will then request 225 the sender 105 to send the data piece 205 for storage into the receiver 110. After the sender-side data verification engine 135 (in sender 105) has transmitted 230 the data piece 205 to the receiver 110, the receive-side data verification engine 155 will store the data piece 205 into the database 235 as a data copy 205a. As a result, the data copy 205a in receiver 110 is identical to the data piece 205 in the receiver 105. The engine 155 also stores the hash value (hash #X) 210a of copy 205a into the hash database 212. Note that the database 235 can store other data, such as for example, data Y (206a) which has a hash value #Y (214a) and data Z (207a) with a hash value #Z (212a). The hash value #Y and hash value #Z are also stored in the hash database 212.

Note also that in other embodiments of the invention, other sender elements (hardware and/or software elements) can perform at least some of the operations discussed above. For example, other sender elements (in the sender 105) can instead perform the transmission of the hash values 210 and data pieces 205 to the receiver 110 and/or can instead receive the request 225 for data. As another example, other receiver elements (in receiver 110) can instead perform the storage of data into the database 235 and storage of hash values into the hash database 212, and/or transmissions of the data requests 225.

An example is now described where a data piece X (205) with hash value 210 is stored in the sender 105, and a hash value 210a is stored in the hash database 211 in the receiver. The stored data piece 205a in the sender 110 will be associated with the stored hash value 210a. In this example, the hash values 210a and 210 have the same value of #X.

An embodiment of the invention provides a data verification technique with a challenge 240, so that the receiver 110 will be able to verify if the stored data 205a and data 205 (with both data having the same hash value #X) are actually identical (i.e., data 205a is an identical copy of data 205).

In an embodiment of the invention, if the receiver-side data verification engine 155 finds (235) a hash value 210a (in hash database 212) with a value that is equal to the value of the transmitted hash value 210, then the receiver-side data verification engine 155 will transmit a challenge 24 to the sender-side data verification engine 135. The receiver 110 uses the challenge 240 to require the sender 105 to provide (to the receiver 110) a sample or "biopsy" of the data piece 205 so that the receiver 110 can verify that the stored data piece 205a is identical to the data piece 205 to be transmitted by the sender 105 to the receiver 110. The challenge 240 will specify a window 305 (see FIG. 3) that overlaps a portion of the stored data piece 205a. As an overview example, assume that the window 305 (FIG. 3) overlaps (covers) an example data set that is denoted by the set {X(o1,l1),X(o2,l2)} for convenience of discussion. In the FIG. 3 example, the window 305 overlaps the byte 2 of stored data piece 205a. However, as will be discussed below, the size or length (L) of a window 305 is adjustable by a user. This data set {X(o1,l1),X(o2,l2)} in the window 305 is part of the stored data piece 205a, and is not currently known by the sender 105. In response to the challenge 240, the sender-side data verification engine 135 will sample the data set in the data piece 205, where the window 305 determines the data set to be sampled by the sender-side engine 135. The sender-side engine 135 will then send the data sample 245 as determined by the window 305.

The receiver-side data verification engine 155 then checks (250) if the sample 245 from the sender 105 matches the actual data set {X(o1,l1),X(o2,l2)} in stored data piece 205a as overlapped by the window 305. If the sample 245 contains a data set (i.e., data set {X(o1,l1),X(o2,l2)} in this example) that matches the data set in window 305 for the stored data piece 205a, the receiver-side data verification engine 155 will conclude that the stored data piece 205a is identical to the data piece 205. As a result, receiver-side data verification engine 155 will send a response 255 to the sender-side data verification engine 135. The response 255 indicates that a copy 205a of the data piece 205 is already stored in the sender 105 and that the sender 105 is not required to send the data piece 205 to the receiver 110.

On the other hand, if the sample 245 contains a data set that does not match the data set in stored data piece 205a for window 305, then the receiver-side data verification engine 155 will provide a response 260 that is programmable by a user. For example, a response 260 could involve the receiver-side data verification engine 155 as issuing 260c a flag or warning to the user (where the flag/warning indicates a potential hash collision), and then sending a request 260a to the sender-side verification engine 135 to send the data piece (X) 205 to the receiver 110. The sender-side engine 135 will then transmit (261) the data (X) 205 and the receiver-side engine 155 will proceed with nominal processing of the transmitted data 205 including, for example, storing the transmitted data piece into the database 235 as a data (X') 205b with a hash collision flag (indicator) 265 that will inform a user to perform an analysis of the data piece 205b to determine if there was a hash collision occurrence and take standard measures that responds to the hash collision occurrence.

As another example, a response 260 could involve the receiver-side data verification engine 155 as issuing 260c a flag or warning to the user (where the flag/warning indicates an exploit attempt from a hostile device), and the receiver-side engine 155 will deny and will not receive the transmission of the data X (205) from the sender 105 (i.e., the engine 155 will terminate the data transaction and terminate subsequent processing of the data transaction).

Note that other programmable responses 260 by the receiver-side data verification engine 155 may be programmed by the user, in response to a mismatch between the sample 245 and the data set in the stored data 205a for a window 305. In another embodiment of the invention, the flagging 206c of the exploit attempt can be omitted and the receiver-side engine 155 can immediately deny 260b the transmission of the data piece 205 from the sender 105.

Therefore, the above-discussed data verification method helps to prevent undetected (blind) errors due to hash collisions by allowing the receiver 110 to request (via challenge 240) a set of varied length samples 245 of an actual data 205 that the sender 105 wants to send to the receiver 110. These samples 245 are dictated by a window 305 that can be arbitrarily determined/selected by receiver-side data verification engine 155. These samples 245 can then be used by the receiver 110 for actual value comparison against the stored data piece 205a that is already associated with stored hash value (#X) 210a in the stored hashes 211. By combining the benefits and efficiencies of the compare-by-hash method with the above described compare-by-value method by use of the window and data sampling, the deterministic nature of previous compare-by-hash method is removed, since the receiver 110 can reject transactions where there is a mismatch of the sampled data and data in the window. As a result, a receiver 110 is less vulnerable to and a less attractive target of malicious attacks from hostile network devices.

It is also noted that while the transmissions of the challenges 240 and samples 245 require another round trip between the receiver and sender, these transmissions can be performed when other transmissions in the network 115 are not occurring. In a single instancing network that sends the hash values and data pieces in batches, the challenges 240 and samples 245 can be sent when the batch transactions are not occurring in the network.

Note also that the receiver-side engine 155 can be programmed so that the frequency of transmission occurrences of the challenges 240 and/or the window 305 sizes are adjustable, depending on, for example, the hostility of the environment and/or the level of confidence/security that is required for the network transmission protocol. For example, a window 305 can be set to any various sizes. As an example, a window 305 can be a one-byte size of data. As another example, a window 305 can be one kilobyte in size to a few kilobytes in size. A window 305 can be sized to a value that is less than the size of the stored data 205 to be verified by the sender 105. For example, a window 305 can be 50% or less in size as compared to the size of the stored data 205a. It is also noted that while the additional challenges and sample transmissions may potentially slightly reduce the network bandwidth savings of single instancing protocols, the methods discussed above do not negatively impact the storage bandwidth savings in the network devices.

Figure 3:
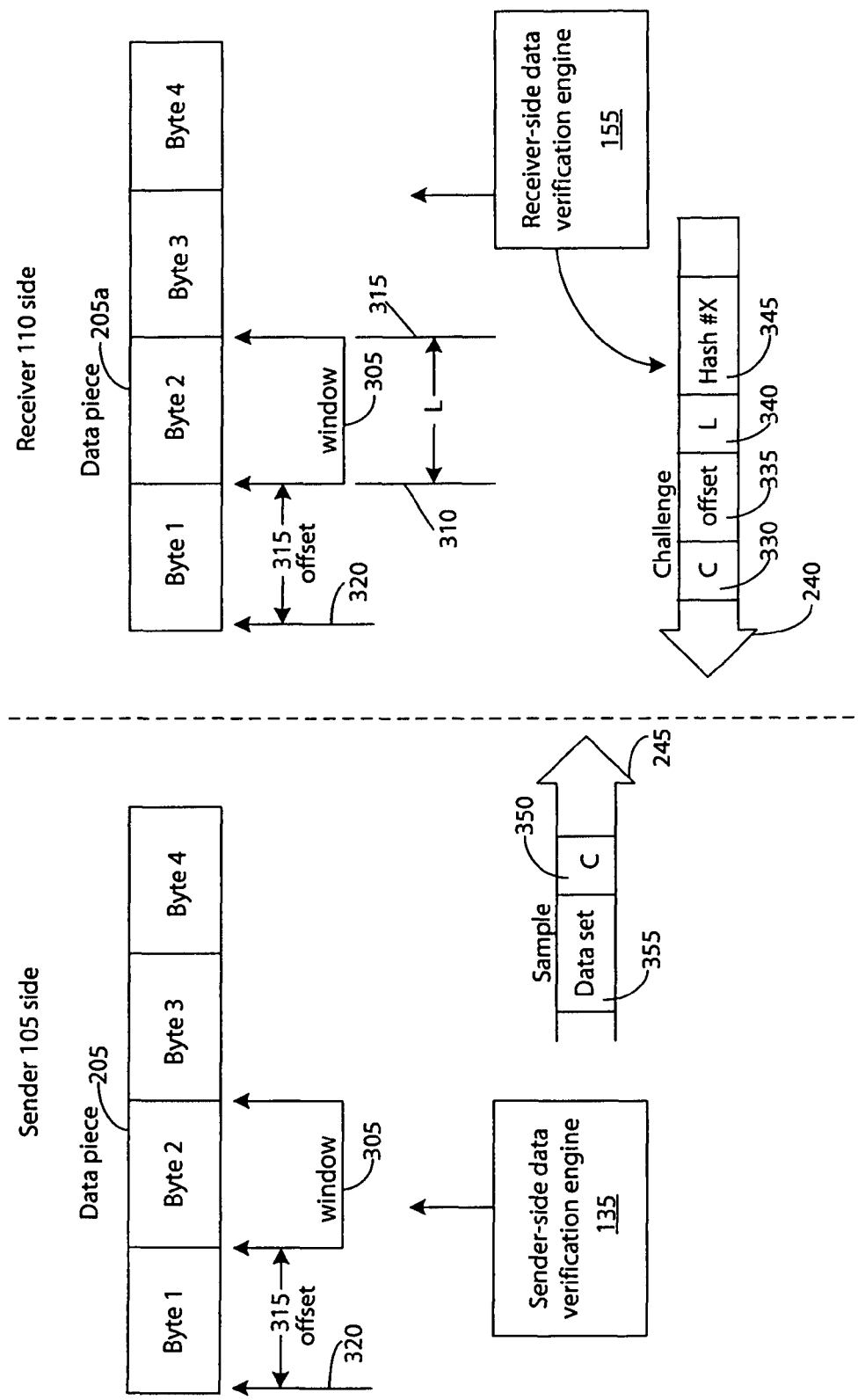
FIG. 3 is a block diagram illustrating an example window in an embodiment of the invention.

FIG. 3 is a block diagram illustrating an example data window 305 in an embodiment of the invention. The receiver side engine 155 sets a data window 305 in the stored data piece 205a in accordance with the following. The beginning boundary 310 of a window 305 is determined by offset 315 which starts from the beginning 320 of the stored data piece 205a and ends at the beginning boundary 310 of the window 305. The length L (or size) of the window 305 is programmable and starts at the beginning boundary 310 and ends at the end boundary 315. In the example of FIG. 3, the window 305 overlaps byte 2 of data piece 205a. In another example, the window 305 would have a larger length L value and would overlap, for example, byte 2 and byte 3 of the data piece 205a. The beginning boundary 320 of the data piece 205a and the position and boundaries of the window 305 are measured and identified based on the count of characters in a byte.

The receiver-side engine 155 packages the challenge 240 to include an identifier 330 that identifies the packet 240 as a challenge packet. Field 335 includes the offset value 315 that identifies the position of the window 305 on the data piece 205a. Field 340 includes the window length (size) value (L). Field 345 contains information that the challenge 240 is a response to the transmitted hash value (#X) 210 for the data piece 205 to be transmitted by the sender 105.

After the sender-side engine 135 receives and examines the challenge 240 from receiver-side engine 155, the sender-side engine 135 will sample the data set in the data piece 205, where the data set to be sampled is dictated by window 305. The challenge 240 identifies the window length (L) via field 340 in the challenge packet 240, and identifies window offset 315 via field 335, and identifies the data piece 205 via hash field 345. In this example, this data set to be sampled is byte 2 in the data piece 205. As mentioned above, the sample data set would be larger (e.g., byte 2 and byte 3 in data piece 205) if the window 305 has a larger length value (L). The sender-side engine 135 will package the sample packet 245 for transmission to the receiver-side engine 155. The sample packet 245 includes a field 350 that identifies the sample packet 245 as a response to the challenge 240. A field 355 indicates the data content of the sample data set (byte 2 in this example) in data piece 205.

When the receiver-side engine 155 receives the sample packet 245 from the sender-side engine 135, the receiver-side engine 155 compares the sample data set 355 (byte 2 in data piece 205 in the example) with the window data set (byte 2 in this example) that is overlapped by the window 305 for the stored data piece 205a. If the compared sample data set 355 and data set in window 305 for stored data piece 205a matches (or mismatches), then the receiver-side engine 155 will perform the appropriate responses as previously discussed above with reference to FIG. 2.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for data verification by challenge, the method comprising:
    storing a data piece and a hash value of the data piece in a receiver;
    receiving, at the receiver, a hash value of a data piece stored in a sender;
    if the hash value of the data piece stored in the sender matches the hash value of the data piece stored in the receiver, then sending a challenge packet from the receiver to the sender, the challenge packet to identify via fields a position and a length of a non-fixed window over a subset of the data piece stored in the receiver;
    receiving, from the sender, a sample data set that is a subset of the data piece stored in the sender, wherein the sample data set is to be determined by the position and the length of the non-fixed window;
    comparing the sample data set with a receiver data set, the receiver data set being the subset of the data piece stored in the receiver corresponding with the non-fixed window; and
    performing a response based on the comparison of the sample data set and the receiver data set.

2. The method of claim 1 wherein performing the response comprises:
    flagging a hash collision, and sending a request for the data piece stored in the sender, if the comparison of the sample data set and the receiver data set results in a mismatch.

3. The method of claim 1 wherein performing the response comprises:
    flagging an exploit attempt, and denying, by the receiver, receipt of a transmission of the data piece stored in the sender, if the comparison of the sample data set and the receiver data set results in a mismatch.

4. The method of claim 1 wherein performing the response comprises:
    denying, by the receiver, a transmission of the data piece stored in the sender, if the comparison of the sample data set and the receiver data set results in a mismatch.

5. The method of claim 1 wherein performing the response comprises:
    sending a response indicating that the data piece stored in the sender will not be transmitted from the sender to the receiver, if the comparison of the sample data set and the receiver data set results in match.

6. The method of claim 1 further comprising:
    if the hash value received from the sender does not match the stored hash value of the data piece stored in the receiver, then requesting a transmission of the data piece stored in the sender from the sender to the receiver.

7. The method of claim 1, further including, selectively determining, by the receiver, the length of the non-fixed window.

8. The method of claim 1, wherein the position of the non-fixed window over the subset of the data piece stored in the receiver is not known to the sender before the sender receives the challenge packet.

9. The method of claim 1, wherein the challenge packet has a frequency of transmission occurrence that is adjustable.

10. The method of claim 1, wherein the sender and receiver are connected in an in-band network system.

11. The method of claim 1, wherein each of the sender and receiver comprises a network device.

12. The method of claim 1, wherein the sender comprises a client computing device and the receiver comprises a server.

13. The method of claim 1 wherein the field in the challenge packet identifying the position of the non-fixed window includes an offset value to identify a start of the position of the non-fixed window on the data piece stored in the receiver relative to the beginning of the data piece stored in the receiver.

14. The method of claim 13 further comprising, sending the challenge packet only the hash value of the data piece stored in the sender matches the hash value of the data piece stored in the receiver.

15. The method of claim 1 wherein comparing the sample data set with a receiver data set includes comparing actual values of the sample data set and receiver data set.

16. The method of claim 1 wherein the data piece stored on the receiver is a file or a chunk of a file, and the data piece stored on the sender is a file or a chunk of a file.

17. An article of manufacture comprising:
    a non-transitory computer-readable medium having stored thereon instructions to:
    receive a hash value of a data piece stored in a sender;
    in response to determining that the hash value received from the sender matches a hash value previously stored in a receiver, send a challenge packet from the receiver to the sender, the challenge packet to identify via fields a position and a length of a variable window that overlaps a subset of a data piece stored in the receiver, both the position and length of the variable window are unknown to the sender before the sender receives the challenge packet;
    receive a sample data set that is a subset of the data piece stored in the sender, the sample data set to be determined by the position and the length of the variable window;
    compare the sample data set with a reference data set, the reference data being the-subset of the data piece stored in the receiver that is overlapped by the variable window; and
    perform a response based on the comparison of the sample data set and the reference data set.

18. A receiver for data verification by challenge, the receiver comprising:
    at least one processor to receive a hash value of a data piece stored in a sender, determine if the hash value of the data piece stored in the sender matches a previously stored hash value of a data piece stored in the receiver, and if a match is determined, send a challenge packet from the receiver to the sender, the challenge packet to identify via fields a position and a length of an adjustable window that overlaps a subset of the data piece stored in the receiver, receive a sample data set that is a subset of the data piece stored in the sender, wherein the sample data set is to be determined by the position and length of the adjustable window, compare the sample data set with a reference data set, the reference data set being the subset of the data piece stored in the receiver that the adjustable window overlaps, and perform a response based on the comparison of the sample data set and the reference data set.

19. The receiver of claim 18 wherein the at least one processor is to perform the response by flagging a hash collision and sending a request for the data piece stored in the sender, if the comparison of the sample data set and the reference data set results in a mismatch.

20. The receiver of claim 18 wherein the at least one processor is to perform the response by flagging an exploit attempt and denying a transmission of the data piece stored in the sender, if the comparison of the sample data set and the reference data set results in a mismatch.

21. The receiver of claim 18 wherein the at least one processor is to perform the response by denying a transmission of the data piece stored in the sender, if the comparison of the sample data set and the reference data set results in a mismatch.

22. The receiver of claim 18 wherein the at least one processor is to perform the response by sending a response indicating that the data piece stored in the sender will not be transmitted from the sender to the receiver, if the comparison of the sample data set and the reference data set results in match.

23. The receiver of claim 18, wherein both the position and the length of the adjustable window are selected at the processor's discretion and are not known to the sender before the sender receives the challenge packet.

24. The receiver of claim 18, wherein the challenge packet has a frequency of transmission occurrence that is adjustable.

25. The receiver of claim 18 wherein if the hash value of the data piece stored in the sender does not match the hash value previously stored in the receiver, then the at least one processor is to request a transmission of the data piece stored in the sender from the sender to the receiver.

26. The receiver of claim 18 wherein the data piece stored in the sender and the data piece stored in the receiver are separately selected from one of a file or a chunk of a file.

27. The receiver of claim 18 wherein the challenge packet further includes a field for a challenge packet identifier.

28. The receiver of claim 18 wherein the challenge packet further includes a field for an indication that the challenge packet is a response to receiving the hash value of the data piece stored in the sender.

\* \* \* \* \*